United States Patent
Rath et al.

(10) Patent No.: US 11,218,706 B2
(45) Date of Patent: Jan. 4, 2022

(54) GRADIENT BASED BOUNDARY FILTERING IN INTRA PREDICTION

(71) Applicant: InterDigital VC Holdings, Inc., Wilmington, DE (US)

(72) Inventors: Gagan Bihari Rath, Cesson-Sevigne (FR); Fabien Racape, Palo Alto, CA (US); Fabrice Urban, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/957,082

(22) PCT Filed: Feb. 25, 2019

(86) PCT No.: PCT/US2019/019344
§ 371 (c)(1),
(2) Date: Jun. 22, 2020

(87) PCT Pub. No.: WO2019/165343
PCT Pub. Date: Aug. 29, 2019

(65) Prior Publication Data
US 2020/0351506 A1 Nov. 5, 2020

(30) Foreign Application Priority Data

Feb. 26, 2018 (EP) .................................... 18305198
Jun. 18, 2018 (EP) .................................... 18305747
Aug. 13, 2018 (EP) .................................... 18306110

(51) Int. Cl.
*H04N 19/159* (2014.01)
*H04N 19/105* (2014.01)
*H04N 19/167* (2014.01)
*H04N 19/176* (2014.01)

(52) U.S. Cl.
CPC ......... *H04N 19/159* (2014.11); *H04N 19/105* (2014.11); *H04N 19/167* (2014.11); *H04N 19/176* (2014.11)

(58) Field of Classification Search
None
See application file for complete search history.

(56) References Cited

U.S. PATENT DOCUMENTS 10,499,053 B2 * 12/2019 Chen .................... H04N 19/593
10,798,375 B2 * 10/2020 Piao ..................... H04N 19/176
(Continued)

OTHER PUBLICATIONS

Chang et al., "Improved Intra Prediction Method Based on Arbitrary Reference Tier Coding Schemes," Proc. 2016 IEEE Picture Coding Symposium (PCS, Dec. 4, 2016, pp. 1-5 (Year: 2016).*
(Continued)

*Primary Examiner* — Reza Aghevli
(74) *Attorney, Agent, or Firm* — Xiaoan Lu

(57) ABSTRACT

After initial intra prediction based on projection along an intra prediction direction, there may exist discontinuities between the predicted block and neighboring blocks. To smooth the block boundary, boundary filtering may be used with intra prediction. In particular, different methods may be used for boundary filtering. The particular filtering method to be used may be selected adaptively based on the intra prediction mode. When gradient-based filtering is selected, the gradient at a reference sample, that is at the same row or column as the current sample, in a reference layer is calculated as the difference between the reference sample and the predicted value for the reference sample using the intra prediction mode. Additional gradient at another reference sample from another reference layer may also be used. Then the initially predicted value for the sample may be adjusted based on the gradient(s) and a decay function.

20 Claims, 10 Drawing Sheets

(56) References Cited

U.S. PATENT DOCUMENTS

| | | | | |
|---|---|---|---|---|
| 2015/0003529 | A1* | 1/2015 | Thirumalai | H04N 19/70 375/240.14 |
| 2015/0036743 | A1* | 2/2015 | Lee | H04N 19/593 375/240.12 |
| 2015/0201212 | A1* | 7/2015 | Zhang | H04N 19/577 375/240.15 |
| 2015/0304665 | A1* | 10/2015 | Hannuksela | H04N 13/161 375/240.02 |
| 2016/0021382 | A1* | 1/2016 | Lee | H04N 19/30 382/233 |
| 2016/0100187 | A1* | 4/2016 | Lee | H04N 19/176 375/240.16 |
| 2017/0078703 | A1* | 3/2017 | Ridge | G06T 9/20 |
| 2017/0085917 | A1* | 3/2017 | Hannuksela | H04N 19/136 |
| 2017/0094288 | A1* | 3/2017 | Hannuksela | H04N 19/146 |
| 2017/0310959 | A1* | 10/2017 | Chen | H04N 19/11 |
| 2017/0347026 | A1* | 11/2017 | Hannuksela | H04L 65/4084 |
| 2018/0139469 | A1* | 5/2018 | Lainema | H04N 19/176 |
| 2019/0037217 | A1* | 1/2019 | Jin | H04N 19/105 |
| 2019/0082184 | A1* | 3/2019 | Hannuksela | H04N 19/172 |
| 2019/0246101 | A1* | 8/2019 | Jin | H04N 19/52 |
| 2019/0268599 | A1* | 8/2019 | Hannuksela | G06T 3/0062 |
| 2019/0281285 | A1* | 9/2019 | Piao | H04N 19/129 |
| 2019/0297339 | A1* | 9/2019 | Hannuksela | H04N 19/59 |
| 2019/0313021 | A1* | 10/2019 | Hannuksela | H04N 19/00 |
| 2020/0177809 | A1* | 6/2020 | Hannuksela | H04N 21/26258 |
| 2020/0260074 | A1* | 8/2020 | Keating | H04N 19/14 |
| 2020/0359014 | A1* | 11/2020 | Piao | H04N 19/129 |
| 2020/0359015 | A1* | 11/2020 | Piao | H04N 19/159 |

OTHER PUBLICATIONS

Rath et al., "CE3-related: Gradient-Based Boundary Filtering in Intra Prediction", Joint Video Experts Team (JVET) of ITU-T SG 16 WP 3 and ISO/IEC JTC 1/SC 29/WG 11, JVET-K0172_r1, 11th Meeting: Ljubjana, SI, Jul. 10-18, 2018.

Bordes et al., "Description of SDR, HDR and 360°, Video Coding Technology Proposal by Qualcomm and Technicolor-Medium Complexity version", Joint Video Experts Team (JVET) of ITU-T SG 16 WP 3 and ISO/IEC JTC 1/SC 29/WG 11, JVET-J0022r1, 10th Meeting: San Diego, US, Apr. 10-20, 2018.

Chang et al., "Improved Intra Prediction Method Based on Arbitrary Reference Tier Coding Schemes", 2016 Picture Coding Symposium, pp. 1-5, Dec. 4, 2016.

Chen et al., "Further improvements to HMKTA-1.0", ITU-Telecommunications Standardization Sector, Study Group 16 Question 6, Video Coding Experts Group (VCEG), VCEG-AZ07_v2, 52 Meeting: Warsaw, Poland, Jun. 19-26, 2015.

Wei, et al. "Improved Intra Angular Prediction with Novel Interpolation Filter and Boundary Filter" 2016 Picture Coding Symposium (PCS), IEEE, 2016.

Yao et al., "Prediction Mode Based Reference Line Synthesis for Intra Prediction of Video Coding", 2017 25th European Signal Processing Conference, (EUSIPCO), pp. 1470-1474, EURASIP, Aug. 28, 2017.

Guo et al., "CE6 Subset d: Intra Prediction with Secondary Boundary", Joint Collaborative Team on Video Coding (JCT-VC) of ITU-T SG16 WP3 and ISO/IEC JTC1/SC29/WG11, JCTVC-G280, 7th Meeting Geneva, CH, Nov. 21-30, 2011.

Zhoa et al., "EE1 related: Simplification and extension of PDPC", Joint Video Exploration Team (JVET) of ITU-T SG 16 WP 3 and ISO/IEC JTC 1/SC 29/WG 11,JVET-H0057, 8th Meeting: Macao, CN Oct. 18-24, 2017.

Chen et al., "Algorithm description of Joint Exploration Test Model 7 (JEM7)", 7.JVET Meeting, Jul. 13, 2017-Jul. 21, 2017, Torino, The Joint Video Exploration Team of ISO/IEC JTC1/SC29/WG11 and ITU-T SG.16, JVET-G1001, pp. 9-10 and pp. 12-13, Aug. 19, 2017.

\* cited by examiner

GRADIENT BASED BOUNDARY FILTERING IN INTRA PREDICTION

This application claims the benefit, under 35 U.S.C. § 371 of International Application No. PCT/US19/019344, filed Feb. 25, 2019, which was published on Aug. 29, 2019, which claims the benefit of European Patent Application Nos. EP18305198.6 filed Feb. 26, 2018, EP18305747.0 filed Jun. 18, 2018 and EP18306110.0 filed Aug. 13, 2018.

TECHNICAL FIELD

The present embodiments generally relate to a method and an apparatus for video encoding or decoding, and more particularly, to a method and an apparatus for boundary filtering for intra prediction in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

Intra prediction in video compression refers to the spatial prediction of a block of samples using information from causal neighbor blocks, that is, neighboring blocks in the same frame which have already been encoded or decoded. Intra prediction is a powerful coding tool since it allows for high compression efficiency in INTRA frames, as well as in INTER frames. Therefore, intra prediction has been included as a core coding tool in many video compression standards including, but not limited to, H.264/AVC and H.265/HEVC.

SUMMARY

According to an embodiment, a method for video decoding is presented, comprising: accessing a predicted value of a sample of a block of an image in a video, corresponding to an intra prediction mode; determining, based on a location of said sample in said block and said intra prediction mode, that said predicted value of said sample is to be adjusted; adjusting said predicted value of said sample, responsive to a reference sample and a predicted value of said reference sample; accessing prediction residual of said sample; and decoding said sample responsive to said adjusted predicted value and said prediction residual.

According to another embodiment, a method for video encoding is presented, comprising: accessing a predicted value of a sample of a block of an image in a video, corresponding to an intra prediction mode; determining, based on a location of said sample in said block and said intra prediction mode, that said predicted value of said sample is to be adjusted; adjusting predicted value of said sample, responsive to reference sample and a predicted value of said reference sample; generating prediction residual for said sample responsive to said adjusted predicted value; and encoding said intra prediction mode and said prediction residual.

According to another embodiment, an apparatus for video decoding is presented, comprising one or more processors, wherein said one or more processors are configured to: access a predicted value of a sample of a block of an image in a video, corresponding to an intra prediction mode; determine, based on a location of said sample in said block and said intra prediction mode, that said predicted value of said sample is to be adjusted; adjust said predicted value of said sample, responsive to a reference sample and a predicted value of said reference sample; access prediction residual of said sample; and decode said sample responsive to said adjusted predicted value and said prediction residual.

According to another embodiment, an apparatus for video encoding is presented, comprising one or more processors, wherein said one or more processors are configured to: access a predicted value of a sample of a block of an image in a video, corresponding to an intra prediction mode; determine, based on a location of said sample in said block and said intra prediction mode, that said predicted value of said sample is to be adjusted; adjust said predicted value of said sample, responsive to a reference sample and a predicted value of said reference sample; generate prediction residual for said sample responsive to said adjusted predicted value; and encode said intra prediction mode and said prediction residual.

According to another embodiment, an apparatus for video decoding is presented, comprising: means for accessing a predicted value of a sample of a block of an image in a video, corresponding to an intra prediction mode; means for determining, based on a location of said sample in said block and said intra prediction mode, that said predicted value of said sample is to be adjusted; means for adjusting said predicted value of said sample, responsive to a reference sample and a predicted value of said reference sample; means for accessing prediction residual of said sample; and means for decoding said sample responsive to said adjusted predicted value and said prediction residual.

According to another embodiment, an apparatus for video encoding is presented, comprising: means for accessing a predicted value of a sample of a block of an image in a video, corresponding to an intra prediction mode; means for determining, based on a location of said sample in said block and said intra prediction mode, that said predicted value of said sample is to be adjusted; means for adjusting said predicted value of said sample, responsive to a reference sample and a predicted value of said reference sample; means for generating prediction residual for said sample responsive to said adjusted predicted value; and means for encoding said intra prediction mode and said prediction residual.

According to another embodiment, a video signal is presented, formed by performing: accessing a predicted value of a sample of a block of an image in a video, corresponding to an intra prediction mode; determining, based on a location of said sample in said block and said intra prediction mode, that said predicted value of said sample is to be adjusted; adjusting predicted value of said sample, responsive to reference sample and a predicted value of said reference sample; generating prediction residual for said sample responsive to said adjusted predicted value; and encoding said intra prediction mode and said prediction residual.

DETAILED DESCRIPTION

Figure 1:
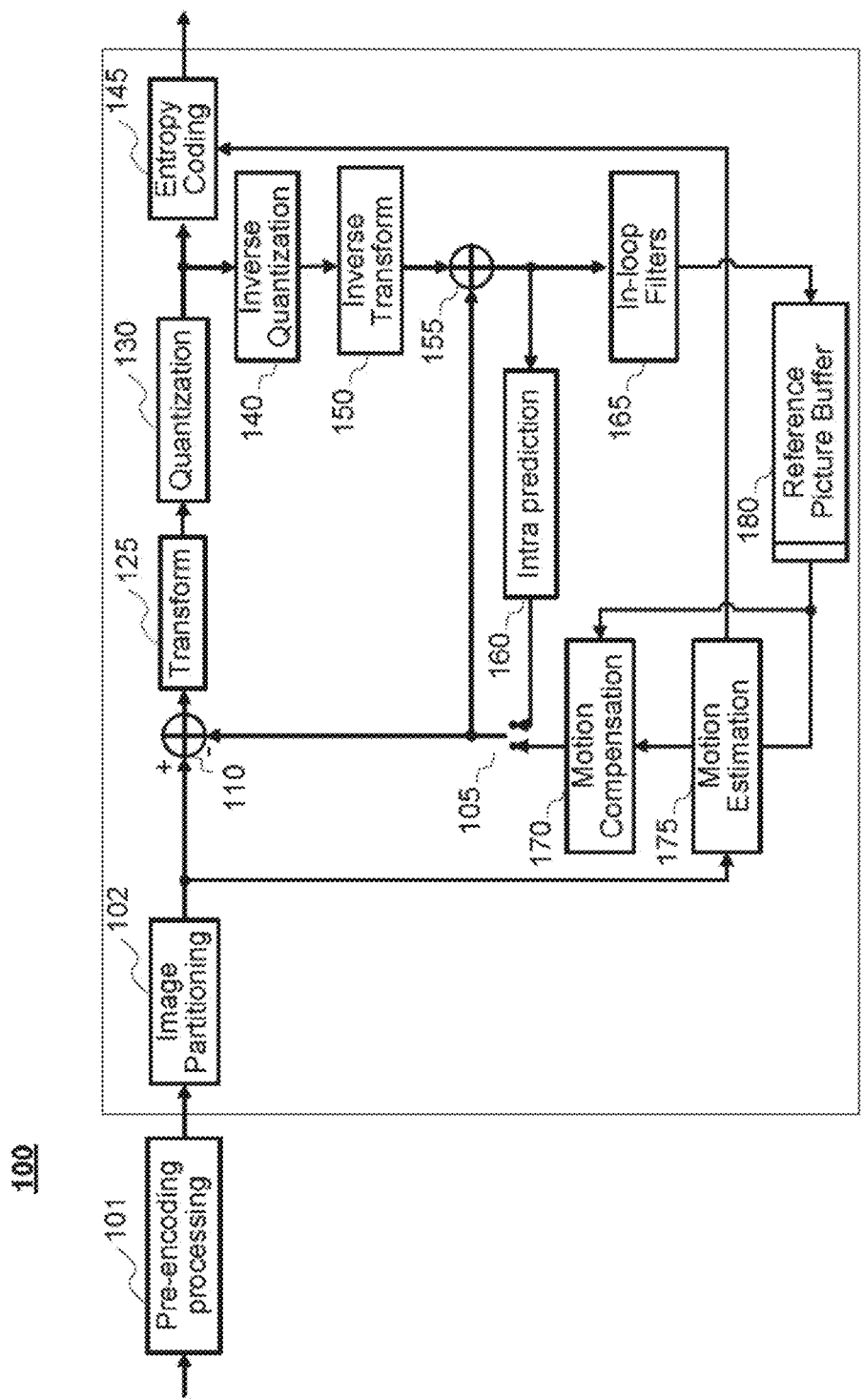
FIG. 1 illustrates a block diagram of an embodiment of a video encoder.

FIG. 1 illustrates an exemplary video encoder 100, such as a High Efficiency Video Coding (HEVC) encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

In order to exploit the spatial redundancy, CUs in intra mode are predicted from reconstructed neighboring samples (i.e., reference samples) within the same slice. The causal neighboring CUs have already been encoded/decoded when the encoding/decoding of the current CU is considered. To avoid mismatch, the encoder and the decoder have the same prediction. Therefore, both the encoder and the decoder use the information from the reconstructed/decoded neighboring causal CUs to form prediction for the current CU.

Figure 3:
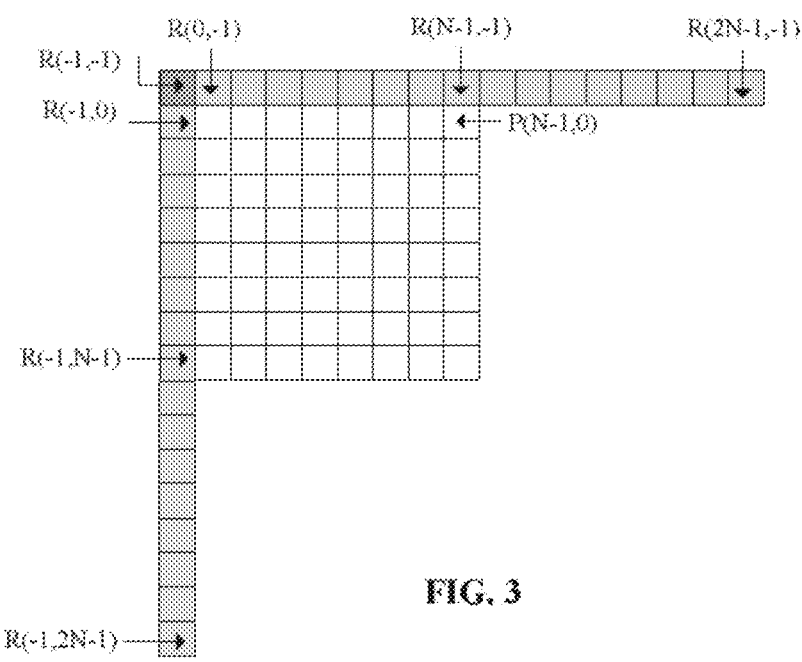
FIG. 3 is a pictorial example depicting the HEVC reference sample generation.

The intra prediction process in HEVC includes three steps: (1) reference sample generation, (2) intra sample prediction, and (3) post-processing (also called "post-filtering" or "boundary filtering") of predicted samples. Exemplary HEVC reference samples are illustrated in FIG. 3, where the reference sample value at coordinate (x,y), with respect to the above-left corner of the current block, is indicated by R(x,y), and the predicted sample value at coordinate (x,y) of the current block is indicated by P(x,y). For a CU of size N×N, a row of 2N decoded samples on the top is formed from the decoded CUs. Similarly, a column of 2N samples on the left is formed from the decoded CUs. The corner sample from the above-left decoded CU is used to fill up the gap between the above row and the left column references. If some of the samples are not available, for example, when the corresponding CUs are not in the same slice or the current CU is at a frame boundary, then reference sample substitution is performed where the missing samples are copied from the available samples in a clock-wise direction. Then, depending on the current CU size and the prediction mode, the reference samples are filtered using a specified filter.

The next step, i.e., the intra sample prediction, consists of predicting the samples of the target CU based on the reference samples. In order to predict different kinds of content efficiently, HEVC supports a range of prediction methods. In particular, planar and DC prediction modes are used to predict smooth and gradually changing regions, whereas directional prediction modes (also referred to as "angular prediction modes") are used to capture different directional structures.

Figure 4A:
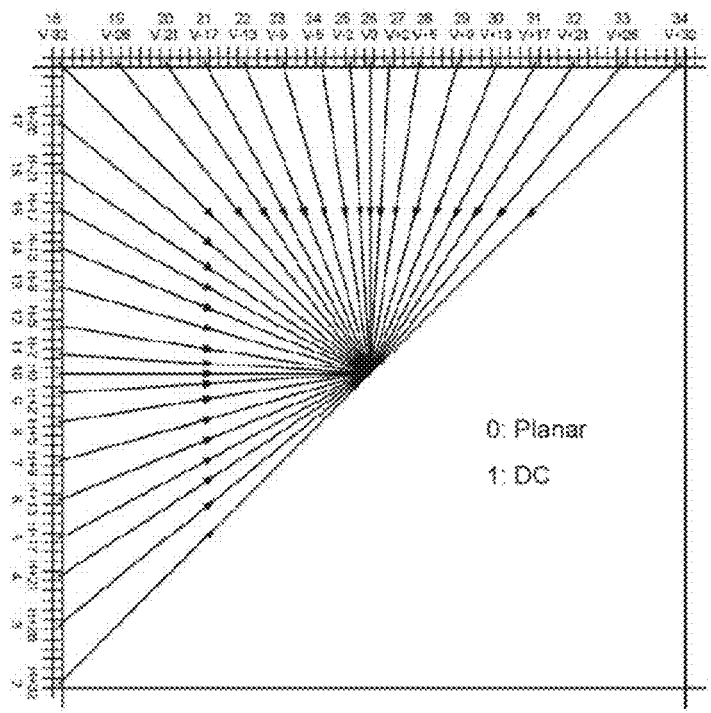
FIG. 4A is a pictorial example depicting intra prediction modes in HEVC.

HEVC supports 33 directional prediction modes which are indexed from 2 to 34. These prediction modes correspond to different prediction directions as illustrated in FIG. 4A, wherein the numbers (i.e., 2, 3, . . . , 34) denote intra prediction mode indices. The prediction modes 2-17 are denoted as horizontal prediction modes (H−26 to H+32), as the predominant sources of prediction is in horizontal direction. The modes 18-34 are denoted as vertical prediction modes (V−32 to V+32) accordingly. "H" and "V" in FIG. 4A are used to indicate the horizontal and vertical directionalities, respectively, while the numeric part of the identifier indicates the samples' displacement (also referred to as "angle parameter") at 1/32 sample fractions.

The directions with non-negative displacements (i.e., H0 to H+32 and V0 to V+32) are also denoted as positive directions, and the directions with negative displacements (i.e., H−2 to H−26 and V−2 to V−32) are also denoted as negative directions.

In HEVC reference software, a reference array is first constructed using the top and left reference samples. For vertical predictions, the reference array is horizontal (i.e., a reference row) and for horizontal predictions, the reference array is vertical (i.e., a reference column). For the modes with negative directions, the reference array needs samples from both the top and left reference arrays.

Once the reference array is constructed, the prediction at any sample position (x,y) inside the target PU is obtained by projecting the sample position to the reference array along the selected direction and interpolating a value for the sample at 1/32 sample accuracy. The predicted sample value is computed by interpolating between two closest reference samples. The interpolated sample is also called the predictor sample.

Some of the prediction modes such as the DC mode and directly horizontal (i.e., mode 10) and directly vertical modes (i.e., mode 26) may cause discontinuity at the CU boundaries of the prediction samples. Therefore, such prediction modes are followed by a post-processing step where the boundary of the predicted samples are smoothed using a low-pass filter or a gradient-based update. Here, directly horizontal mode refers to the prediction mode when the reference samples on the left side of a target block are repeated horizontally to the right for intra prediction. Similarly, directly vertical mode refers to the prediction mode when the reference samples on the top of a target block are repeated vertically down for intra prediction. In particular, the low-pass filter is applied in DC prediction mode whereas the gradient-based update is applied in directly horizontal and directly vertical modes.

For the DC prediction mode, both the top and the left boundary of the target block are filtered as follows. The predicted sample at (0,0) is filtered using the 3-tap smoothing filter [1 2 1]/4 as:

$$P'(0,0)=(R(0,-1)+2*P(0,0)+R(-1,0)+2)>>2.$$

The remaining predicted samples at the top boundary and at the left boundary are filtered using the 2-tap filter [3, 1]/4 as:

$$P'(x,0)=(3*P(x,0)+R(x,-1)+2)>>2, 1\leq x<N;$$

$$P'(0,y)=(3*P(0,y)+R(-1,y)+2)>>2, 1\leq y<N.$$

For directly vertical prediction, the left boundary of the block is likely to have discontinuities. Therefore, the samples on the left boundary are replaced by filtered values using the gradient (also called slope) at the boundary of the block as follows:

$$P'(0,y)=\text{Clip}(P(0,y)+((R(-1,y)-R(-1,-1))>>1)),$$
$$0\leq y<N,$$

where the clipping function ensures that the filtered value lies within the valid range of sample values. Likewise, for directly horizontal prediction, the top boundary of the block is filtered as:

$$P'(x,0)=\text{Clip}(P(x,0)+((R(x,-1)-R(-1,-1))>>1)),$$
$$0\leq x<N.$$

Since the above filtering process increases complexity, this is performed only for target blocks of size smaller than 32×32. Furthermore, since the chroma predictions are reasonably smooth, this post-filtering is restricted to only the luma blocks.

Because there are multiple intra prediction modes available, the decoder needs the mode information to form the prediction for an intra-coded CU. The encoder encodes the mode information using a most probable mode (MPM) set for the luma component. HEVC specifies an MPM set consisting of three distinct modes, which is constructed from the prediction modes of the intra coded CUs on the top and left of the current CU, the planar mode, the DC mode, and the directly vertical mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (e.g., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
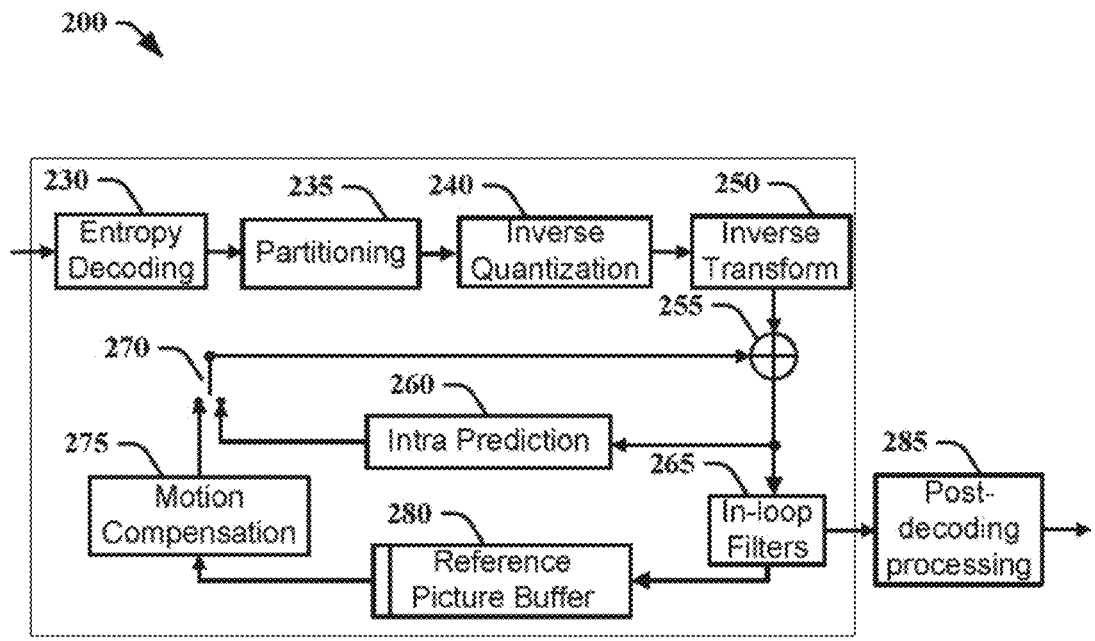
FIG. 2 illustrates a block diagram of an embodiment of a video decoder.

FIG. 2 illustrates a block diagram of an exemplary video decoder 200, such as an HEVC decoder. In the exemplary decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (e.g., conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

As described above, in HEVC, encoding of a frame of a video sequence is based on a block structure. A frame is divided into square coding tree units (CTUs), which may undergo quadtree (QT) splitting to multiple coding units based on rate-distortion criteria. Each CU is either intra-predicted, that is spatially predicted from the causal neighbor CUs, or inter-predicted, that is, temporally predicted from reference frames already decoded. In I-slices all CUs are intra-predicted, whereas in P and B slices the CUs can be either intra or inter-predicted. For intra prediction, HEVC defines 35 prediction modes which include one planar mode (indexed as mode 0), one DC mode (indexed as mode 1) and 33 directional prediction modes (indexed as modes 2-34).

In JEM, the QTBT (Quadtree plus Binary Tree) structure removes the concept of multiple partition types in HEVC, i.e., removes the separation of CU, PU and TU concepts. A Coding Tree Unit (CTU) is firstly partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components.

Figure 4B:
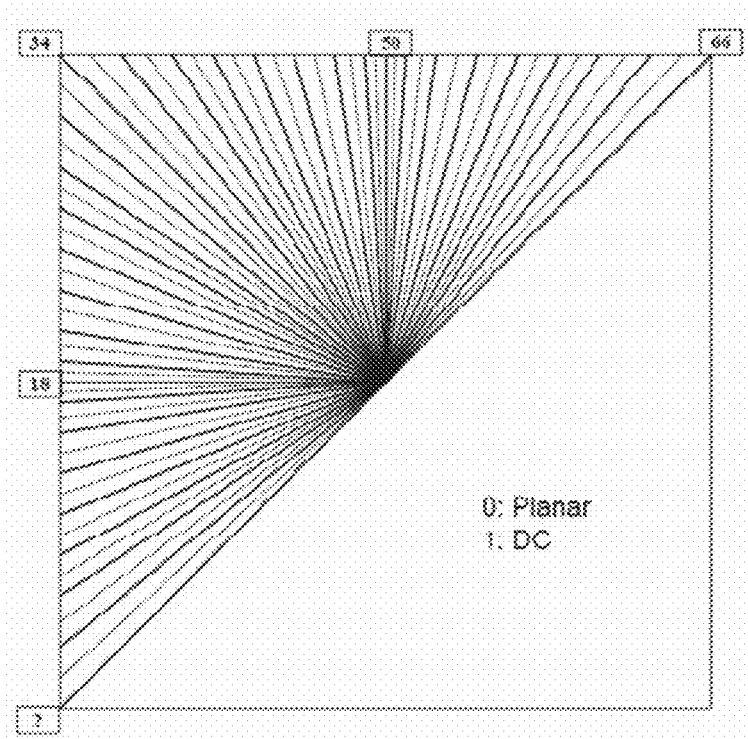
FIG. 4B is a pictorial example depicting intra prediction modes in JEM (Joint Exploration Model).

As possible improvements to HEVC, JEM 3.0 uses 65 directional intra prediction modes in addition to the planar and DC modes, as shown in FIG. 4B. The modes are numbered from 2 to 66 in the increasing order, in the same fashion as done in HEVC from 2 to 34. The 65 directional prediction modes include the 33 directional prediction modes specified in HEVC plus 32 additional directional prediction modes that correspond to angles in-between two original angles. In other words, the prediction direction in JEM has twice the angle resolution of HEVC. The higher number of prediction modes has been proposed to exploit the possibility of angular structures with proposed larger block sizes. Corresponding to the higher number of modes, there is a higher number of angle parameter A values.

Among the 65 directional intra prediction modes, mode 18 is the directly horizontal mode, mode 50 is the directly vertical mode, modes 2-17 and 51-66 have positive directions, and modes 19-49 have negative directions. Modes 2 and 66 are strictly diagonal modes (i.e., at ±45 degree), and a mode (e.g., modes 3-10 and 58-65) can be considered as a diagonal mode if the difference between the mode and the strictly diagonal mode (e.g., mode 2, 66) is smaller than a threshold (e.g., 8).

In addition to square CUs, JEM can also have rectangular CUs because of the QTBT structure. In general, for a target block of width W and height H, the reference arrays on the top and on the left have length 1+W+H samples. For interpolating the predictor samples, higher order filters have been proposed (4-tap cubic and Gaussian filters) for different block sizes.

Similar to HEVC, some prediction modes may give rise to discontinuity at the block boundary. Therefore, in these prediction modes, the prediction process is followed by a post-filtering step which attempts to create smooth intensity changes at the block boundaries. In JEM, the boundary filtering has been extended to several diagonal intra modes besides the directly horizontal and directly vertical modes. The two horizontal modes closest to the directly horizontal mode (i.e., modes 17 and 19) undergo a similar post-filtering using gradient-based update:

$$P'(x,0)=\text{Clip}(P(x,0)+((R(x,-1)-R(-1,-1))>>2)),$$
$$0 \le x < W.$$

Likewise, the two vertical modes closest to the directly vertical mode (i.e., modes 49 and 51) undergo a similar post-filtering:

$$P'(0,y)=\text{Clip}(P(0,y)+((R(-1,y)-R(-1,-1))>>2)),$$
$$0 \le y < H.$$

For some other angular modes, where the prediction direction originates at one reference array and ends at the other, there can be intensity discontinuity at the block boundary with the latter reference array. In JEM, this discontinuity is reduced by filtering the boundary samples for some such modes. Boundary samples up to four columns or rows are further adjusted using a two-tap (for intra modes 2 and 66) or a three-tap filter (for intra modes 3-10 and 58-65). Examples of the boundary prediction filters for intra mode 66 and 58-65 are shown in FIG. 5A and FIG. 5B.

Figure 5A:
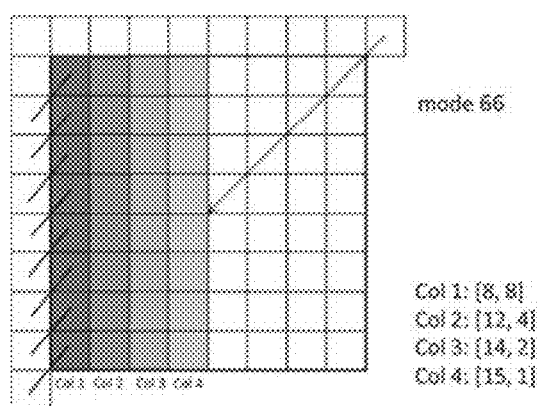
FIG. 5A and FIG. 5B are pictorial examples depicting intra post-filters for several angular modes in JEM.
Figure 5B:
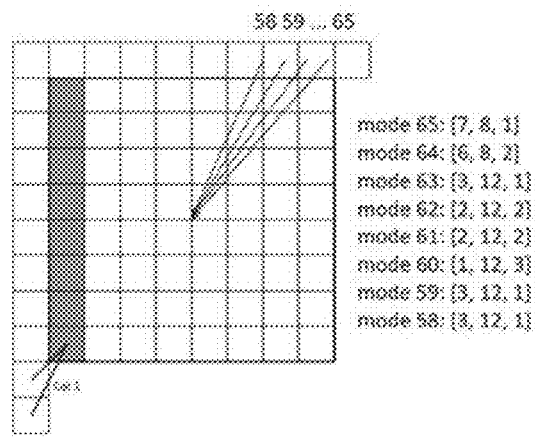

For example, as shown in FIG. 5A for mode 66, the four samples on row y are filtered as:

$$P'(0,y)=(8*P(0,y)+8*R(-1,y+1)+8)>>4;$$

$$P'(1,y)=(12*P(1,y)+4*R(-1,y+2)+8)>>4;$$

$$P'(2,y)=(14*P(2,y)+2*R(-1,y+3)+8)>>4;$$

$$P'(3,y)=(15*P(3,y)+R(-1,y+4)+8)>>4;$$

where R(−1,y) denotes the reference sample on the left side of the target block at y=0, 1, 2, . . . .

For modes 58-65, the single sample on row y is filtered as shown in FIG. 5B as:

$$P'(0,y)=(\text{filter}[1]*P(0,y)+\text{filter}[0]*R(-1,y+\text{offset}[0])+\text{filter}[2]*R(-1,y+\text{offset}[1])+8)>>4,$$

where filter[k] denotes the kth filter coefficient associated with the mode (shown in FIG. 5B), and offset[0] and offset[1] denote the y-offsets of the two reference samples from the target sample location. Offset[0]=1 and offset[1]=2 for modes 60-65, and offset[0]=2 and offset[1]=3 for modes 58-59.

A boundary filters for intra prediction modes 2 and 3-10 are similar. Using the reference samples on the top, the target samples in the rows 1-4 are filtered in mode 2, and the samples in row 1 are filtered in modes 3-10. This postfiltering is applied to luma blocks only.

The gradient based filtering had been proposed in the context of HEVC in an article entitled "Intra Prediction with Secondary Boundary," by M. Guo et al., JCTVC-G280, Geneva, November 2011 (hereafter "JCTVC-G280"). In JCTVC-G280, for the vertical direction, the predicted samples on the first two columns are modified as:

$$P'(x,y)=P(x,y)+((R(-1,y)-R(-1,-1)+(1<<x))>>(x+1),$$
$$x=0,\ 1;\ y=0,1,\ldots N-1,$$

where R(−1, y) denotes the reference sample on the left reference array at (−1,y) and R(−1,−1) is the top-left reference sample.

Similarly, for the horizontal direction, the predicted samples on the first two rows are modified as:

$$P'(x,y)=P(x,y)+((R(x,-1)-R(-1,-1)+(1<<y))>>(y+1),$$
$$y=0,\ 1;\ x=0,1,\ldots N-1,$$

where R(x,−1) denotes the reference sample on the top reference array at (x,−1). JCTVC-G280 also applies the concept to the two positive directions closest to the vertical or horizontal direction. Considering the 35 modes in HEVC, these directions will be associated with modes 8 and 9 (mode 10 is the horizontal direction), and modes 27 and 28 (mode 26 is the vertical direction). For modes 27 and 28, the predicted samples on the first column are modified as:

$$P'(x,y)=P(x,y)+((R(-1,y)-R\_y+2)>>2),\ x=0,$$
$$y=0,1,\ldots N-1,$$

where R_y denotes the predicted value, or the predictor, for the sample R(−1,y) on the left reference array. The predictor is interpolated if it does not coincide with any reference sample on the top reference array. Similarly, for the modes 8 and 9, the predicted samples on the first row are modified as:

$$P'(x,y)=P(x,y)+((R(x,-1)-R\_x+2)>>2),\ y=0,$$
$$x=0,1,\ldots N-1,$$

where R_x denotes the predicted value, or the predictor, for the sample R(x, −1) on the top reference array. The predictor is interpolated if it does not coincide with any reference sample on the left reference array.

Figure 6:
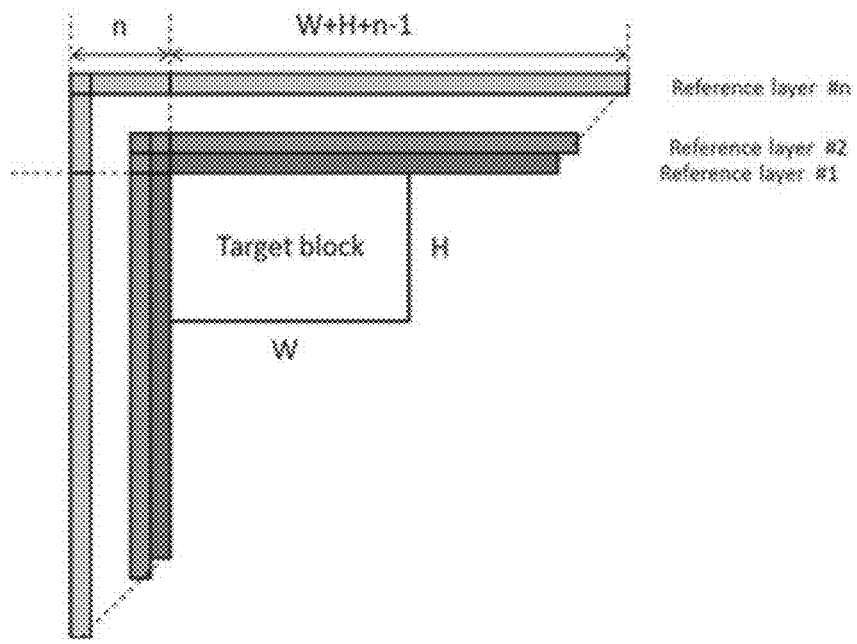
FIG. 6 is a pictorial example depicting multi-reference intra prediction.

Multi-reference intra prediction refers to intra prediction using multiple rows and columns of reference samples. Here we consider a reference layer as a combination of reference arrays (one on the top and one on the left) at a certain distance from the target block and corner samples. That is, by a reference layer, we refer to both the top and the left reference arrays. For example, the existing reference arrays (in HEVC or JEM), which have a sample distance of 1 from the left column or top row of the current block, constitute the first reference layer. If we then consider the decoded samples right above the top reference array and to left of the left reference array, they will constitute the second reference layer, and so on, as shown in FIG. 6. In some other works, the reference layer is referred to as a reference tier or reference line. In the example as shown in FIG. 6, reference layer n consists of (W+H+n−1) decoded row samples on the top, (W+H+n−1) decoded column samples on the left, and (2*n−1) top-left corner samples.

Multi-reference intra prediction is also called arbitrary tier reference intra prediction (as described in "Arbitrary reference tier for intra directional modes," Y.-J. Chang, P.-H, C.-L. Lin, J.-S. Tu, and C.-C. Lin, JVET-O0043, Geneva, CH, May 2016 or "Arbitrary Reference Tier for Intra Directional Modes, with Supplementary Results," Y.-J. Chang, P.-H. Lin, C.-L. Lin, C.-C. Lin, JVET-D0099, Chengdu, CN, October 2016.) or multi-line intra prediction (as described in "Multiple line-based intra prediction," J. Li, B. Li, J. Xu, R. Xiong, and G. J. Sullivan, JVET-O0071, Geneva, CH, May 2016).

There are several existing methods to predict a target block based on multiple reference layers. In one method, for a given prediction mode, a target block is predicted using each reference layer. The reference layer producing the best RD (Rate-Distortion) performance is signaled to the decoder so that the decoder uses the same reference layer as the encoder. The prediction with any reference layer can be made in the same manner as done in HEVC, or predictions made from the reference layers farther from the target block can be improved by compensating by the residues for the reference layers closer to the target block.

A commonly owned EP application, entitled "Method and apparatus for intra prediction with multiple weighted references" by G. Rath et al. (EP Patent Application No. 17305794.4), the teachings of which are specifically incorporated herein by reference, discloses another method, where the target block can be predicted as a weighted sum of predictions based on all the reference layers. If Pn represents the prediction based on the n-th reference layer, the effective prediction for the target pixel at (x,y) is obtained as $$P(x,y)=(w1*P1(x,y)+w2*P2(x,y)+\ldots+wn*Pn(x,y))/(w1+w2+\ldots+wn)$$

where w1, w2, . . . , wn are weights known to both the encoder and the decoder. The weights are normalized such that $$w1+w2+\ldots+wn=(1<<k)$$

for some positive integer k. Since the nth reference layer is closer to the target block than the (n+1)th reference layer, it is assumed that $w1 \geq w2 \geq \ldots \geq wn$.

In the above existing multi-reference intra prediction methods, the post-filtering still uses the reference samples on the first reference layer since it is adjacent to the target block boundaries on the top and on the left. In the following, we propose several embodiments that utilize multiple reference layers to ameliorate the boundary smoothing in intra prediction.

The present embodiments can be applied to any number of reference layers. However, with a higher number of reference layers, the computational complexity increases, and the efficacy of boundary filtering will be less pronounced as the reference layers will be farther away from the target block boundary. Thus, in the following examples, without loss of generality, only two reference layers are used.

Vertical Boundary Filtering

For the modes closest to the directly vertical mode, i.e., when the mode index difference between a mode and the directly vertical mode is smaller than a threshold (e.g., modes 48 49, 51, 52 when the threshold is 3), we propose to filter the left boundary samples as:

$$P'(0,y)=\text{Clip}(P(0,y)+(w1*((R(-1,y)-R(-1,-1))>>2)+w2*((R(-2,y)-R(-2,-2))>>2))/(w1+w2)),$$
$$0 \leq y < H,$$

where w1 and w2 denote the weights assigned to the 1st and 2nd reference layers. As an example, we can choose w1 equal to 3 and w2 equal to 1. Notice that the second differential term computes the slope for the second layer. We may apply this filtering to luma blocks provided the target block width and height are both smaller than 32 to limit the computational complexity.

Horizontal Boundary Filtering

Likewise, for the modes closest to the directly horizontal mode (e.g., modes 16, 17, 19, 20), we propose to filter the top boundary samples as:

$$P'(x,0)=\text{Clip}(P(x,0)+(w1*((R(x,-1)-R(-1,-1))>>2)+w2*((R(x,-2)-R(-2,-2))>>2))/(w1<w2)),$$
$$0 \leq x < W.$$

We may apply this filtering to luma blocks provided the target block width and height are both smaller than 32. Note that the difference between the existing boundary filtering in JEM and the above methods is the inclusion of the second reference layer slope.

For some angular prediction modes, for example, modes 2 to 10 and 58 to 66, we propose both a gradient approach and a low-pass filtering as described in the following.

Gradient-Based Method

Figure 7A:
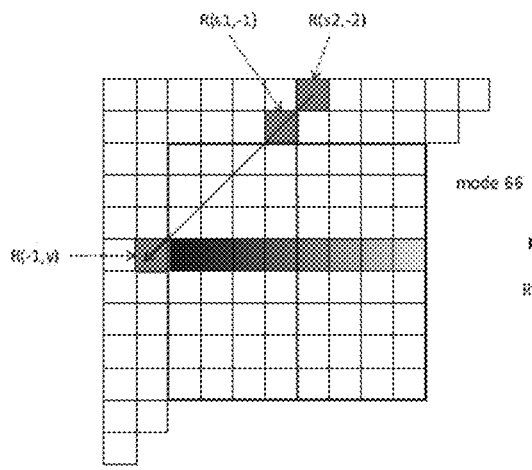
FIG. 7A is a pictorial example depicting two predictors used for a reference sample on the left reference in mode 66.

In this method, we first compute the slope at the reference samples along the considered intra prediction direction. Consider a vertical prediction mode, for example, between 58 and 66. For such a mode, we compute the slopes at (−1,y), $0 \leq y < H$ as $\Delta(y)=R(-1,y)-P(-1,y)$, where $P(-1,y)$ denotes the predicted value for the reference sample $R(-1,y)$. The predicted sample value is calculated using the two reference layers as a weighted sum of predictors:

$$P(-1,y)=(w1*R(s1,-1)+w2*R(s2,-2))/(w1+w2);$$

where $R(s1,-1)$ denotes the predictor on the first reference layer and $R(s2,-2)$ denotes the predictor on the second reference layer as shown in FIG. 7A. Note that, for the above prediction modes, the predictors will lie on the top portion of reference layers. Both predictors can be computed, for example, using the existing interpolation methods in JEM (either using the cubic filter, or the 4-tap Gaussian filter, etc.), when indices s1 and s2 have fractional parts.

We then modify the predicted sample values on row y as $$P'(x,y)=\text{Clip}(P(x,y)+(\Delta(y)*L(x)), 0 \leq x < W, \quad (1)$$

where L(x) is a decay function having values in the closed interval [0, 1]. For fixed-point implementation, we can use an alternative formulation as follows:

$$P'(x,y)=\text{Clip}(P(x,y)+(\Delta(y)*L(x)+(k*L\ \max/2))/(k*L\ \max)), 0 \leq x < W,$$

where L(x) can have positive integral values, L max is the maximum value of L(x), and k is a tuning factor having value greater than 1. For example, we can use $L(x)=(32>>((x<<1)>>2))$, and k=2. In this case, we will get:

$$P'(x,y)=\text{Clip}(P(x,y)+(\Delta(y)*L(x)+32)/64), 0 \leq x < W.$$

The above formulation will assign larger weights (i.e., L(x)) to the samples closer to the left boundary of the block, Thus, the filtered P'(x,y) value will become closer to the original predicted values as the sample lies farther from the left boundary (i.e., as x increases). The above decay function has values L(x)=32, 32, 16, 16, 8, 8, 4, 4, 2, 2, 1, 1, 0 . . . 0 for x=0, 1, 2, 3, 4, . . . . Substituting this value above, we see that the weight (L(x)) for the slope would decrease by half for every two columns. After twelve columns, all original predicted samples in the target block will remain unchanged.

Here we use the same decay function for all the above modes. However, in general, the decay function can be different for different intra prediction modes. The decay function L(x) can also take other forms. For example, $L(x)=64>>(x<<2)$, $L(x)=3>>((1+x)<<1)$, or $L(x)=32>>(1<<(x>>1))$.

Figure 7B:
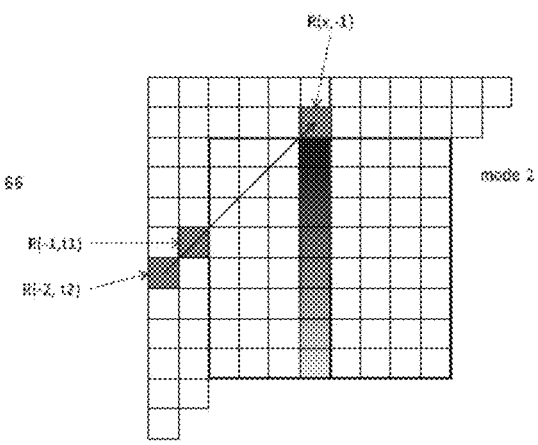
FIG. 7B is a pictorial example depicting two predictors used for a reference sample on the top reference in mode 2.

Likewise for the horizontal modes (e.g., 2 to 10), we compute the slopes at (x,−1), $0 \leq x < W$, as $\Delta(x)=R(x,-1)-P(x,-1)$, where $P(x,-1)$ denotes the predicted value for sample $R(x,-1)$. The predicted sample value is calculated using the two reference layers as a weighted sum of predictors:

$$P(x,-1)=(w1*R(-1,t1)+w2*R(-2,t2))/(w1+w2);$$

where $R(-1, t1)$ denotes the predictor on the first reference layer and $R(-2, t2)$ denotes the predictor on the second reference layer as shown in FIG. 7B. Note that, for the above prediction modes, the predictors will lie on the left portion of the reference layers. Both predictors can be computed, for example, using the existing interpolation methods in JEM (either the cubic filter or the Gaussian filter, etc.) when the indices t1 and t2 have fractional parts.

We then modify the predicted sample values on column x as:

$$P'(x,y)=\text{Clip}(P(x,y)+\Delta(x)*L(y)), 0 \leq y < H,$$

where L(y) is a decay function. We can use the same decay function as above for the vertical directions, or use a different function.

As a variation of this method, we can also compute the slope at the second reference layer (i.e., at R(−2,y) or R(x,−2)) and include it in the above formulation as a weighted sum, that is, $\Delta(y)$ or $\Delta(x)$ is computed as a weighted sum of the gradients for the first reference layer and the second reference layer. In another variation, the slopes at the two references can be compared and used as a condition to decide if the above filtering should be applied to the target block, or a low-pass filtering should be applied, which is presented in the following.

In the above, the filtering is applied in the context of intra prediction with multiple reference layers. It should be noted that the gradient approach can also be applied to a target block even if the usage of multiple reference layers is disabled. In this case, instead of a weighted average, the predictions for the reference samples will be computed using samples from one reference layer only (but on the opposite side of the target block).

In one embodiment, we use a similar formulation as JCTVC-G280 for computing the gradient but with different shift parameters to calculate the update term for the predicted samples. In addition, we may apply the filtering to all positive directions including the vertical and the horizontal directions. Furthermore, we do not limit the number of columns or rows, to be filtered, to just one or two, but make them adaptive depending on the block size. This is achieved by applying different shift parameters to the computed gradient values. The shift parameters are selected so as to result in a dyadic decay of the gradient values away from the block boundary, and they are similar to the shift parameters given in an article entitled "Simplification and Extension of PDPC," X. Zhao, V. Seregin, A. Said, and M. Karczewicz, JVET-H0057, Macao, October 2017 (hereinafter "NET-H0057").

We will consider 67 prediction modes as in JEM. Also, for generality, we will consider a rectangular target block having width W and height H. Consider any prediction mode in the range 50-66, these modes are associated with positive vertical angular directions. The directions span from −90 degree to −135 degree in clockwise direction. For these modes, the reference samples on the left of the target block, i.e., $R(-1,y)$, $0 \le y < H$, can be predicted just like any target pixel. Considering any of these modes, let R_y denote the predictor for the reference sample $R(-1,y)$. Now we can compute the gradient at $(-1,y)$, $0 \le y < H$, as $$\Delta(y)=R(-1,y)-R\_y.$$

Figure 11A:
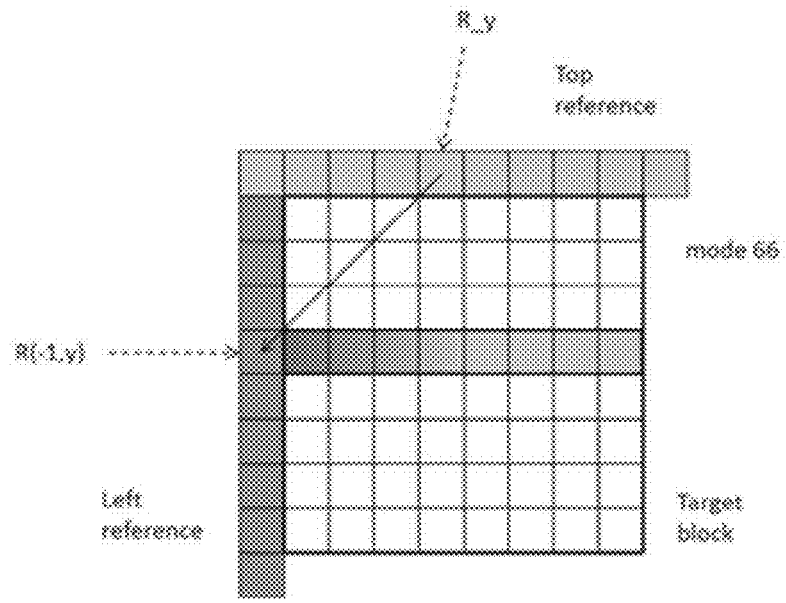
FIG. 11A illustrates an example of computing a predictor sample in JEM mode 66.

The predictor sample value is computed in the same manner as in JEM, as shown in an example in FIG. 11A for mode 66. If the predictor sample's location coincides with a reference sample location, that reference sample is used as the predictor; otherwise an interpolated value is used as the predictor. In JEM, the interpolation can be performed with 4-Tap cubic or Gaussian filters.

We then modify the predicted sample values on row y as $$P'(x,y)=\text{Clip}(P(x,y)+(\Delta(y)*L(x)),\ 0 \le x < W;$$

where $L(x)$ is a decay function having values in the closed interval [0, 1], and the clipping function has the range equal to the dynamic range of the sample value. For fixed-point implementation, we can use an alternative formulation as follows:

$$P'(x,y)=\text{Clip}(P(x,y)+(\Delta(y)*L(x)+(k*L\ \text{max}/2))/(k*L\ \text{max})),\ 0 \le x < W; \quad (2)$$

where $L(x)$ can have positive integral values, L max is the maximum value of $L(x)$, and k is a tuning factor having value greater than or equal to 1. For example, we can use $L(x)=(32 \gg ((x \ll 1) \gg 2))$, and k=2. In this case, we will get:

$$P'(x,y)=\text{Clip}(P(x,y)+(\Delta(y)*L(x)+32) \gg 6),\ 0 \le x < W.$$

Another example is $L(x)=(32 \gg ((x \ll 1) \gg s))$, where the shift parameter s can be based on the values of width and height of the target block, for example, s=(log 2(W)−1+log 2(H)−1)>>2.

Though, in general, the decay function can be different for different prediction modes, here we use the same decay function for all the above modes.

For mode 50, which corresponds to the vertical direction, the predictor for all reference samples $R(-1,y)$, $0 \le y < H$, is the top-left reference sample, which is $R(-1,-1)$. In this special case, the gradient is calculated as:

$$\Delta(y)=R(-1,y)-R(-1,-1),\ 0 \le y < H,$$

For modes 51 and 52, which are nearly vertical, the predictors for all reference samples $R(-1,y)$, $0 \le y < H$, are close to the top-left reference sample $R(-1,-1)$, if the height of the target block is small. In this case, we can also use the above gradient calculation for simplicity since we do not need to compute the predictors.

Similar to modes 51 and 52, we also propose to apply the above filtering to the two modes 48 and 49, which correspond to negative vertical angular directions, but which are nearly vertical. For higher accuracy, we can apply this filtering if the target block height is small.

Now consider any prediction mode in the range 2-18. These modes are associated with positive horizontal angular directions. The directions span from 45 degree to 0 degree in clockwise direction. For these modes, the reference samples on the top of the target block, i.e., $R(x,-1)$, $0 \le x < W$, can be predicted just like any target pixel. Considering any of these modes, let R_x denote the predictor for the reference sample $R(x,-1)$. Now we can compute the gradient at $(x,-1)$, $0 \le x < W$, as $$\Delta(x)=R(x,-1)-R\_x.$$

Figure 11B:
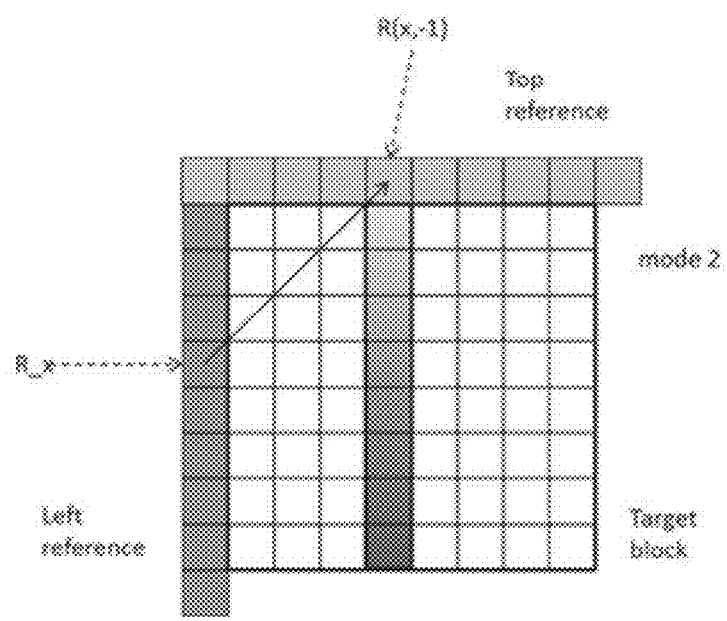
FIG. 11B illustrates an example of computing a predictor sample in JEM mode 2.
Figure 12:
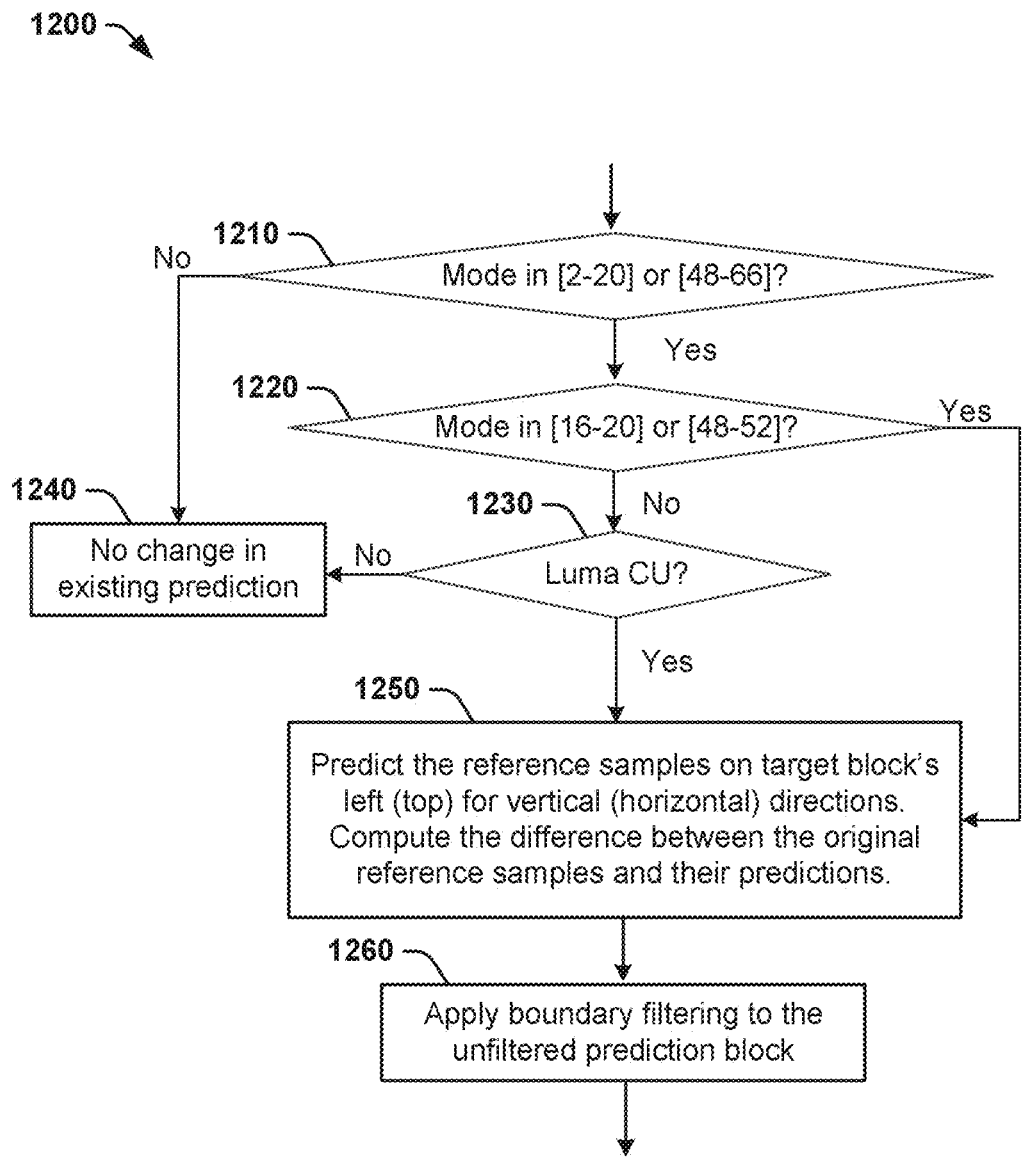
FIG. 12 illustrates an exemplary method of video encoding or decoding with adaptive post-filtering for intra prediction, according to another embodiment.

The predictor sample value can be computed in the same manner as in JEM, as shown in an example in FIG. 11B for mode 2.

We then modify the predicted sample values on column x as:

$$P'(x,y)=\text{Clip}(P(x,y)+\Delta(x)*L(y)),\ 0 \le y < H,$$

where $L(y)$ is a decay function. We can use the same decay function as mentioned above for the vertical directions, or use a different function. Using the same decay function for fixed-point implementation, we get:

$$P'(x,y)=\text{Clip}(P(x,y)+(\Delta(x)*L(y)+32) \gg 6),\ 0 \le y < H$$

For mode 18, which is the horizontal direction, the predictor for all reference samples $R(x,-1)$, $0 \le x < W$, is the top-left reference sample $R(-1,-1)$. In this special case, the gradient is calculated as:

$$\Delta(x)=R(x,-1)-R(-1,-1),\ 0 \le x < W.$$

For modes 16 and 17, which are nearly horizontal, the predictors for all reference samples $R(x,-1)$, $0 \le x < W$, are close to the top-left reference sample $R(-1,-1)$, if the width of the target block is small. In this case, we can also use the above gradient calculation for simplicity since we do not need to compute the predictors.

Similar to modes 16 and 17, we also propose to apply the above filtering to the two modes 19 and 20, which correspond to negative horizontal angular directions, but which are nearly horizontal. For higher accuracy, we can apply this filtering if the target block width is small.

Since chroma predictions are rather smooth, we can apply the above post-filtering to only Luma blocks. Secondly, as in JEM, we can reduce the additional complexity by applying this to target blocks of small size.

Before we present several embodiments, here we compare our boundary filtering method with intra prediction with PDPC, for vertical and horizontal directions, as proposed in JVET-H0057.

As proposed in JVET-H0057, when PDPC is enabled, the prediction for a target pixel is modified as $$P'(x,y) = \text{Clip}((wL*R(-1,y) + wT*R(x,-1) + wTL*R(-1,-1) + (64-wL-wT-wTL)*P(x,y) + 32) \gg 6),$$

where wL, wT, and wTL are weigh corresponding to the reference samples on the left, top, and top-left respectively. For the vertical direction, wTL=−wL. Substituting, this value above for wTL, we get $$P'(x,y) = \text{Clip}((wL*R(-1,y) + wT*R(x,-1) - wL*R(-1,-1) + (64-wL-wT+wL)*P(x,y) + 32) \gg 6),$$

which can be rewritten as $$P'(x,y) = \text{Clip}((wL*(R(-1,y) - R(-1,-1)) + wT*R(x,-1) + (64-wT)*P(x,y) + 32) \gg 6).$$

But, since the direction of prediction is vertical, P(x,y)= R(x,−1). Substituting this in above equation, we get, $$P'(x,y) = \text{Clip}((wL*(R(-1,y) - R(-1,-1)) + 64*R(x,-1) + 32) \gg 6),$$

which can be rewritten as $$P'(x, y) = \text{Clip}(R(x, -1) + (wL*(R(-1, y) - R(-1, -1)) + 32) \gg 6)$$
$$= \text{Clip}(P(x, y) + (wL*(R(-1, y) - R(-1, -1)) + 32) \gg 6).$$

Comparing this to Eq. (2), we see that, if we use L(x)=wL with the same shift parameter value, the filtered samples will have the same values as obtained with PDPC. In an analogous manner, we can also show that, in the case of the horizontal direction, if we choose L(y)=wT with the same shift parameter value, the filtered samples will have the same values as obtained with PDPC.

Low-Pass Filtering Approach

Figure 8A:
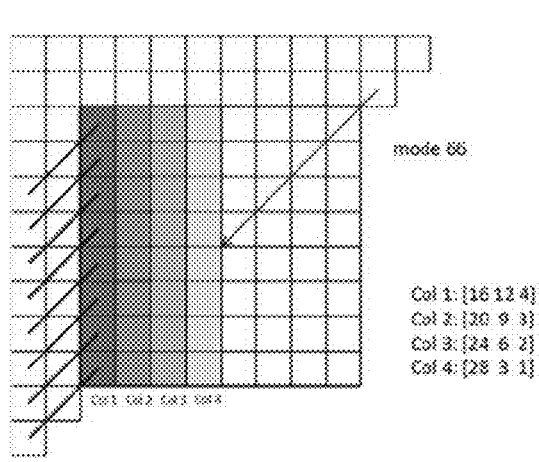
FIG. 8A is a pictorial example depicting boundary filtering using low-pass filters with two reference layers in mode 66.

In the low-pass filtering approach, we include the second reference layer in the filtering process. For mode 66, as shown in FIG. 8A, the four samples on row y, 0≤y<H are filtered as:

$$P'(0,y) = (16*P(0,y) + 12*R(-1,y+1) + 4*R(-2,y+2) + 16) \gg 5;$$

$$P'(1,y) = (20*P(1,y) + 9*R(-1,y+2) + 3*R(-2,y+3) + 16) \gg 5;$$

$$P'(2,y) = (24*P(2,y) + 6*R(-1,y+3) + 2*R(-2,y+4) + 16) \gg 5;$$

$$P'(3,y) = (28*P(3,y) + 3*R(-1,y+4) + R(-2,y+5) + 16) \gg 5;$$

Likewise, for mode 2, the four samples on the column x, 0≤x<W, are filtered as:

$$P'(x,0) = (16*P(x,0) + 12*R(x+1,-1) + 4*R(x+2,-2) + 16) \gg 5;$$

$$P'(x,1) = (20*P(x,1) + 9*R(x+2,-1) + 3*R(x+3,-2) + 16) \gg 5;$$

$$P'(x,2) = (24*P(x,2) + 6*R(x+3,-1) + 2*R(x+4,-2) + 16) \gg 5;$$

$$P'(x,3) = (28*P(x,3) + 3*R(x+4,-1) + R(x+5,-2) + 16) \gg 5;$$

Figure 8B:
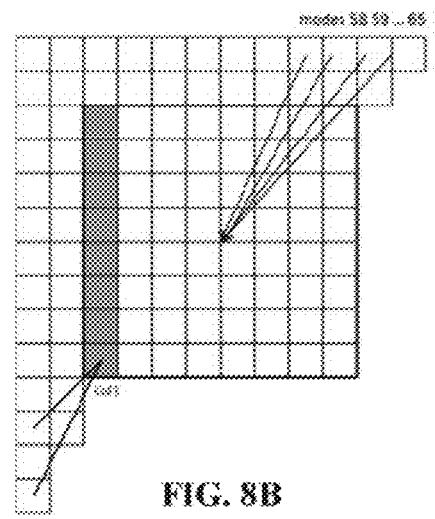
FIG. 8B is a pictorial example depicting boundary filtering using low-pass filters with two reference layers in mode 58-65, according to one embodiment.

For modes 58-65, as shown in FIG. 8B, the single sample on row y is filtered as:

$$P'(0,y) = (\text{filter}[0]*P(0,y) + \text{filter}[1]*R(-1,y+\text{offset}[0]) + \text{filter}[2]*R(-1,y+\text{offset}[1]) + \text{filter}[3]*R(-2,y+\text{offset}[2]) + \text{filter}[4]*R(-2,y+\text{offset}[3]) + 16) \gg 5,$$

where offset[0] and offset[1] denote the y-displacements of the two reference samples on the first reference layer, and offset[2] and offset[3] denote the y-displacements of the two reference samples on the second reference layer from the target sample, respectively. As an example, we can use the filters and offset values for the considered modes as described in TABLE 1,

TABLE 1

| mode | filter[ ] | offset[ ] |
|---|---|---|
| 58 | [24, 3, 3, 1, 1] | [2, 3, 4, 6] |
| 59 | [24, 4, 2, 1, 1] | [2, 3, 4, 5] |
| 60 | [20, 3, 6, 1, 2] | [1, 2, 3, 4] |
| 61 | [20, 4, 5, 2, 1] | [1, 2, 3, 4] |
| 62 | [20, 5, 4, 2, 1] | [1, 2, 3, 4] |
| 63 | [16, 7, 5, 1, 3] | [1, 2, 2, 3] |
| 64 | [16, 8, 4, 2, 2] | [1, 2, 2, 3] |
| 65 | [16 10, 2, 3, 1] | [1, 2, 2, 3] |

For modes 3-10, the filtering is done in an analogous manner. Using the reference samples on the top two reference layers, the target samples in row 1 are filtered using the same filtered coefficients and offsets.

In the above, low-pass filtering is described with respect to different modes, namely, different filters are used for different (sets of) modes. It should be noted that the filters and the mapping between titters and modes are just for exemplary purposes, and the present embodiments can be applied to other filters and other mappings between the filters and modes.

Since chroma predictions are rather smooth, we propose the above post-filtering to be applied to only luma blocks. Secondly, as in JEM, we can reduce the additional complexity by applying the post-tittering to target blocks of specific size.

In the following, assuming the JEM codec is used, we present several exemplary embodiments that use the proposed boundary filtering in intra prediction with multiple reference layers.

Figure 9:
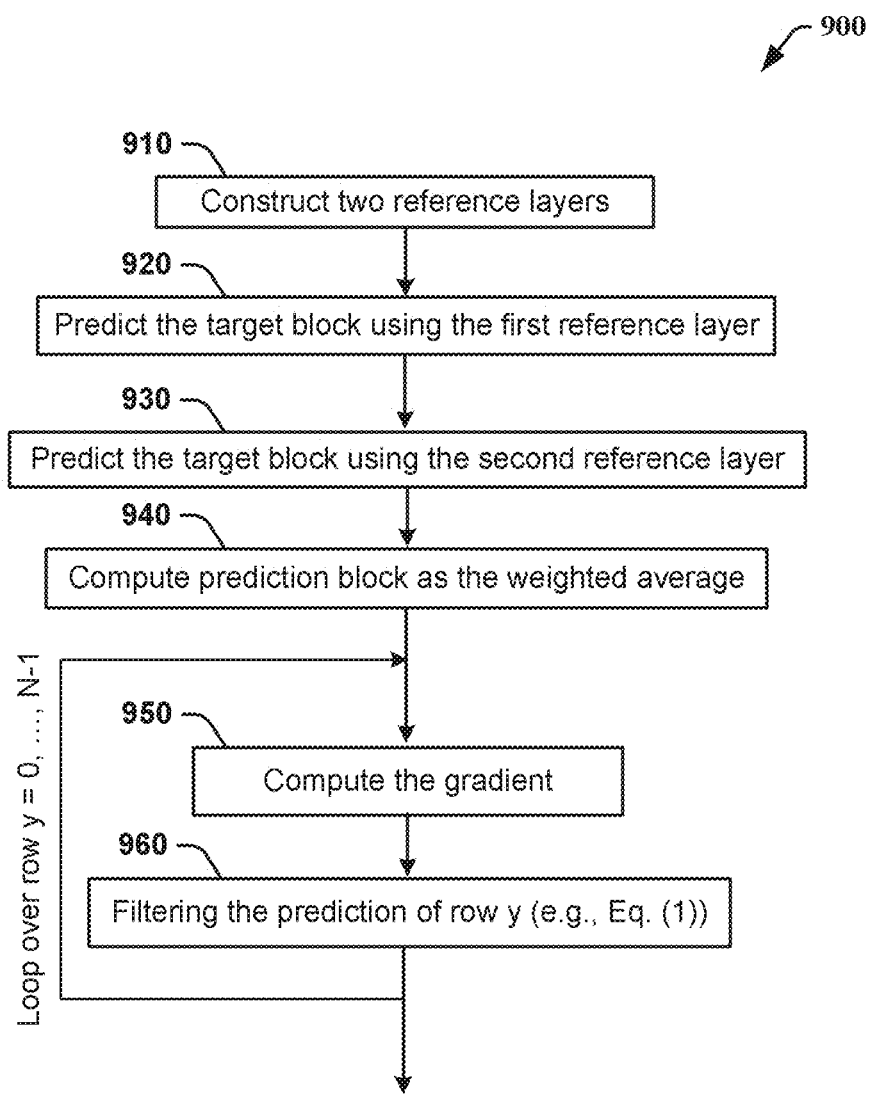
FIG. 9 illustrates an exemplary method of intra prediction with gradient-based post-filtering, according to one embodiment.

FIG. 9 illustrates an exemplary method 900 for performing gradient-based post-filtering in intra prediction, according to an embodiment. To predict a target block using an angular intra prediction mode, before making the prediction, the reference layers are constructed (910), for example, as shown in FIG. 6, by using the already decoded samples in the top, top-right, left, left-bottom, and top-left CUs and then filtered. Then, for a given prediction mode, we predict (920, 930) the target block, first using the first reference layer, then using the second reference layer, and then compute (940) the prediction as a weighted average of the two.

For each row y, we perform the gradient-based filtering as described above. The filtering method can use gradient computed (950) at either one reference layer, or at two reference layers and then taking a weighted average of the two. This embodiment also includes the case when only one reference layer is used for generating the prediction (i.e., steps 930 and 940 are omitted) by deactivating the multi-reference usage parameter. The predictions at row y are then adjusted (960) by post-filtering, for example, according to Eq. (1). After each row is filtered, the intra prediction for the target block is completed. At the encoder side, the prediction residuals for the block can then be calculated based on the original block and the predicted block, and the residual block is encoded as well as the selected intra prediction mode. At the decoder side, the block can be decoded as a sum of the predicted block and the residual block.

Figure 10:
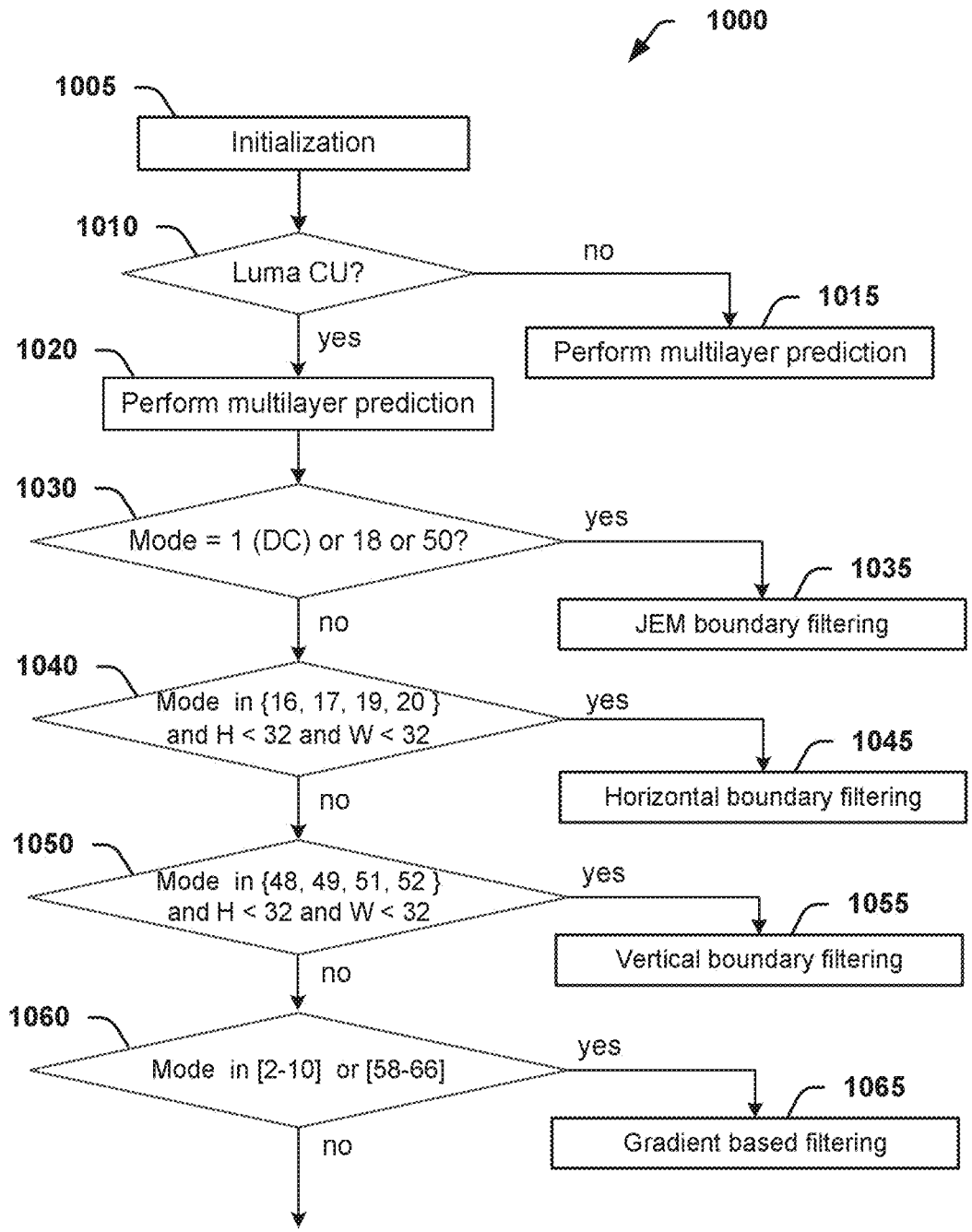
FIG. 10 illustrates an exemplary method of video encoding or decoding with adaptive post-filtering for intra prediction, according to one embodiment.

FIG. 10 illustrates an exemplary method 1000 for adaptively choosing the boundary filtering method for intra prediction, according to an embodiment. Method 1000 can be used at both the encoder and decoder. Method 1000 starts at initialization step 1005. At initialization, the encoder or decoder may access the intra prediction mode for the current block, and decide whether the current block is a luma or chroma block. If the current block is not a luma block (1010), then the encoder or decoder performs (1015) multi-reference intra prediction for the chroma block and the intra prediction is completed.

Otherwise, if the block is a luma block, the encoder or decoder performs (1020) multi-reference intra prediction for the luma block. Then based on the intra direction mode, the boundary filtering method is adaptively selected.

In particular, if (1030) the intra mode is DC mode (1), directly horizontal mode (18), or directly vertical mode (50), the encoder or decoder may choose (1035) the JEM boundary filtering method. Otherwise, if (1040) the mode is a mode very close to the directly horizontal mode (1040), i.e., the difference of the mode indices between the current mode and the directly horizontal mode is smaller than a threshold (e.g., mode 16, 17, 19, 20), then the encoder or decoder may choose (1045) the horizontal boundary filtering method. Otherwise, if (1050) the mode is a mode very close to the directly vertical mode, i.e., the difference of the mode indices between the current mode and the directly vertical mode is smaller than a threshold (e.g., mode 48, 49, 51, 52), then the encoder or decoder may choose (1055) the vertical boundary filtering method. Steps 1040 and 1050 may further consider the block size and the encoder or decoder only chooses horizontal or vertical filtering when the block size is smaller than 32×32. Otherwise, if (1060) the mode is diagonal and in positive directions (e.g., between modes 2-10 and 58-66), the encoder or decoder may choose (1065) the gradient-based filtering method, for example, using method 900, If the mode does not satisfy any of the above conditions, then the encoder or decoder does not perform any post-processing and the prediction is completed.

In the boundary filtering with angular prediction modes generally only one boundary (i.e., the top boundary or the left boundary) is filtered, and the filtering is typically only applied for an intra prediction mode with a positive direction including both directly vertical and directly horizontal modes, and only one or two negative directions close to the directly vertical and directly horizontal modes. Usually for the horizontal modes, the top boundary is filtered, that is, the samples in the target block that are close to the top boundary (i.e., samples with a sample distance to the top boundary smaller than a threshold) are adjusted; and for the vertical modes, the left boundary is filtered. Exactly how many samples are filtered may be based on the filtering method and the intra prediction mode.

In the above, the gradient-based approach is used for some directions considering a trade-off between the compression efficiency gain and computational complexity increase. It should be noted that it is not mandatory to restrict the application of the gradient-based approach only to the modes as described above. Rather, it can be applied to all positive prediction directions. Furthermore, the present embodiments can still be applied when the number of intra prediction modes go beyond 67, which is supported by JEM codec (for example, the future H266 standard may support more than 67 intra prediction modes). In that case, the proposed gradient-based filtering can still be applied to some or all positive prediction directions. For example, the gradient-based filtering can be applied to diagonal modes in positive directions.

Method 1000 may be modified. For example, step 1065 may be replaced by low-pass filtering as described before. In another example, if the prediction mode is close to the strictly diagonal mode, the gradient-based method can be used followed by the low-pass filtering. If the usage of multiple reference layers is deactivated, then we compute gradient with one reference layer, which we use in gradient-based filtering, and then use the existing boundary filters in JEM, This embodiment also includes the combined cases where we can apply the gradient-based method to certain eligible modes and the low-pass filtering to some other modes, and both to some eligible modes. The decision to apply either of the two filtering methods can be decided adaptively or be based on a pre-determined rule. As an example, we can apply the low-pass filtering to mode 2 and mode 66 always. For all modes, we can decide on the application of the gradient-based method or the low-pass filtering with a threshold or block size criterion. Referring back to FIG. 10, the encoder/decoder prediction process is the same as method 1000 except that the gradient-based filtering (1065) is replaced by combined gradient and low-pass boundary filtering.

The methods as described above can be applied at different levels, for example, at a slice level, a picture level, or a sequence level, and the usage of a proposed method can be signalled in the bitstream. For example, we can signal the usage of the proposed method to the decoder using a one-bit flag in the slice header, the Picture Parameter Set (PPS) header, or the Sequence Parameter Set (SPS) header.

We performed experiments with the JEM code in All-INTRA (AI) configuration with only one frame from NET test sequences. We used two reference layers for predicting a target block and we considered all positive prediction directions except those included in vertical and horizontal boundary filtering (e.g., modes 2-15 and 53-66) in the gradient-based and low-pass boundary filtering. In the first step of prediction, we performed prediction for the target block using the two reference layers. In the second step, if the mode belonged to any of the above modes, first we computed the average gradient magnitudes at the two reference layers. If the average gradient at the second reference layer was smaller than twice that at the first reference layer, then we performed gradient-based filtering using the computed gradients at the first reference layer; otherwise, we used the low-pass filtering. If the prediction mode was 2 or 66, we used the low-pass filtering irrespective of the gradient-based filtering.

Table 2 shows the BD-rate (Bjøntegaard Delta-Rate) performance of the proposed multi-reference boundary filtering versus the existing single-reference boundary filtering with multi-reference intra prediction. We see that, with only marginal complexity increase, we can get a BD-rate gain of 0.14% on the average for the luma component.

TABLE 2

| | Over JEM | | | | |
|---|---|---|---|---|---|
| | Y | U | V | EncT | DecT |
| UHD1 | −0.18% | −0.33% | −0.36% | 103% | 101% |
| HD1 | −0.10% | −0.23% | −0.78% | 103% | 101% |
| Class C | 0.18% | 0.67% | −0.86% | 103% | 100% |
| Class D | 0.02% | −0.53% | 1.42% | 102% | 104% |
| Average | −0.14% | −0.28% | −0.57% | 103% | 101% |

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the values of the weights, the block size, filter length, filter coefficients, or the specific modes corresponding to a filtering method. It should be noted that the specific values are for exemplary purposes and the present embodiments are not limited to these specific values.

The above methods of boundary filtering can be used to modify the intra prediction module (160, 260) of the JVET or HEVC encoder and decoder as shown in FIG. 1 and FIG. 2. Moreover, the present embodiments are not limited to JVET or HEVC, and can be applied to other standards, recommendations, and extensions thereof. Various embodiments described above can be used individually or in combination.

Figure 13:
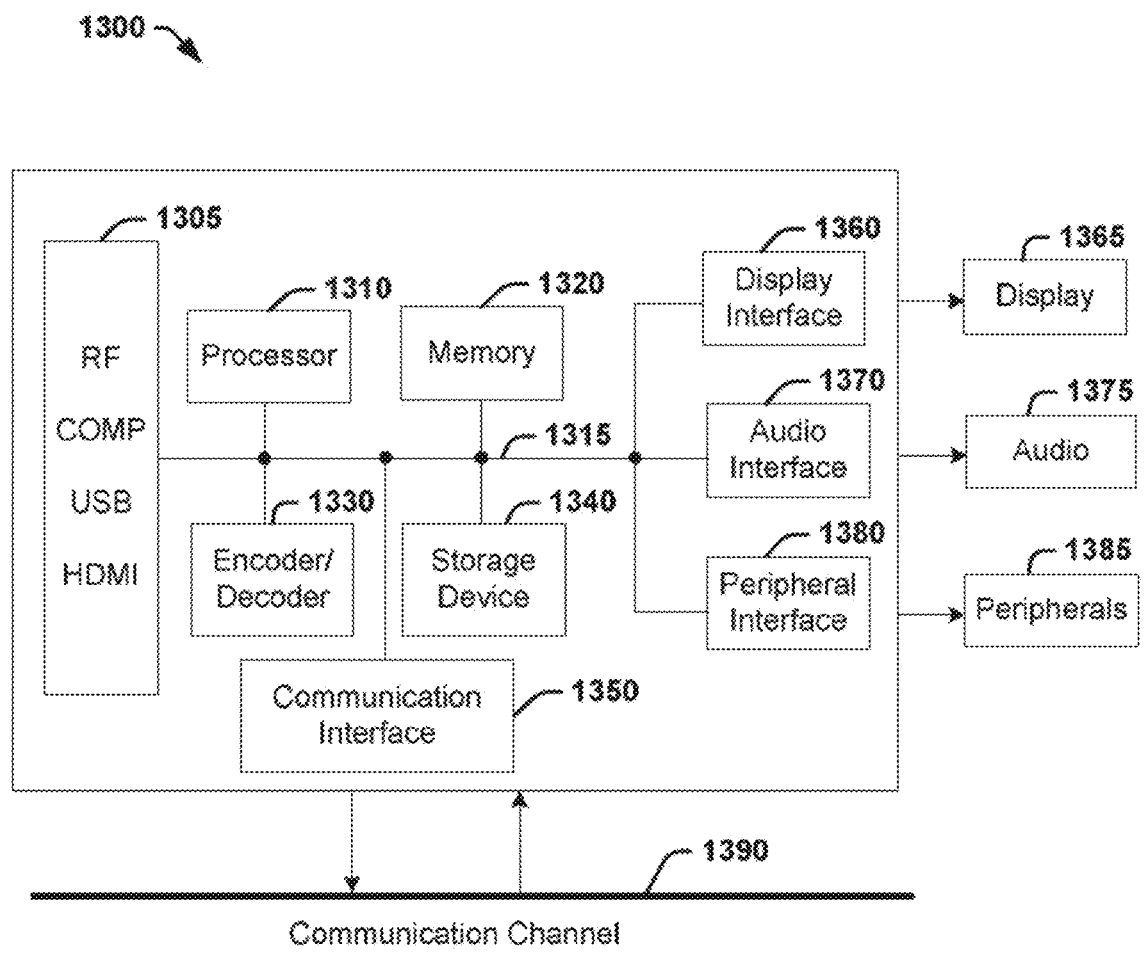
FIG. 13 illustrates a block diagram of a system within which aspects of the present embodiments can be implemented.

FIG. 13 illustrates a block diagram of an example of a system in which various aspects and embodiments are implemented. System 1300 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1300, singly or in combination, can be embodied in a single integrated circuit, multiple ICs, and/or discrete components. For example, in at least one embodiment, the processing and encoder/decoder elements of system 1300 are distributed across multiple ICs and/or discrete components. In various embodiments, the system 1300 is communicatively coupled to other systems, or to other electronic devices, via, for example, a communications bus or through dedicated input and/or output ports. In various embodiments, the system 1300 is configured to implement one or more of the aspects described in this document.

The system 1300 includes at least one processor 1310 configured to execute instructions loaded therein for implementing, for example, the various aspects described in this document. Processor 1310 can include embedded memory, input output interface, and various other circuitries as known in the art. The system 1300 includes at least one memory 1320 (e.g., a volatile memory device, and/or a non-volatile memory device). System 1300 includes a storage device 1340, which can include non-volatile memory and/or volatile memory, including, but not limited to, EEPROM, ROM, PROM, RAM, DRAM, SRAM, flash, magnetic disk drive, and/or optical disk drive. The storage device 1340 can include an internal storage device, an attached storage device, and/or a network accessible storage device, as non-limiting examples.

System 1300 includes an encoder/decoder module 1330 configured, for example, to process data to provide an encoded video or decoded video, and the encoder/decoder module 1330 can include its own processor and memory. The encoder/decoder module 1330 represents module(s) that can be included in a device to perform the encoding and/or decoding functions. As is known, a device can include one or both of the encoding and decoding modules. Additionally, encoder/decoder module 1330 can be implemented as a separate element of system 1300 or can be incorporated within processor 1310 as a combination of hardware and software as known to those skilled in the art.

Program code to be loaded onto processor 1310 or encoder/decoder 1330 to perform the various aspects described in this document can be stored in storage device 1340 and subsequently loaded onto memory 1320 for execution by processor 1310. In accordance with various embodiments, one or more of processor 1310, memory 1320, storage device 1340, and encoder/decoder module 1330 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1310 and/or the encoder/decoder module 1330 is used to store instructions and to provide working memory for processing that is needed during encoding or decoding. In other embodiments, however, a memory external to the processing device (for example, the processing device can be either the processor 1310 or the encoder/decoder module 1330) is used for one or more of these functions. The external memory can be the memory 1320 and/or the storage device 1340, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1300 can be provided through various input devices as indicated in block 1305. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1305 have associated respective input processing elements as known in the art. For example, the RF portion can be associated with elements suitable for (i) selecting a desired frequency (also referred to as selecting a signal, or hand-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1300 to other electronic devices across USB and/or HDMI connections. It is to be understood that various aspects of input processing, for example, Reed-Solomon error correction, can be implemented, for example, within a separate input processing IC or within processor 1310 as necessary. Similarly, aspects of USB or HDMI interface processing can be implemented within separate interface ICs or within processor 1310 as necessary. The demodulated, error corrected, and demultiplexed stream is provided to various processing elements, including, for example, processor 1310, and encoder/decoder 1330 operating in combination with the memory and storage elements to process the datastream as necessary for presentation on an output device.

Various elements of system 1300 can be provided within an integrated housing, Within the integrated housing, the various elements can be interconnected and transmit data therebetween using suitable connection arrangement 1315, for example, an internal bus as known in the art, including the I2C bus, wiring, and printed circuit boards.

The system 1300 includes communication interface 1350 that enables communication with other devices via communication channel 1390. The communication interface 1350 can include, but is not limited to, a transceiver configured to transmit and to receive data over communication channel 1390. The communication interface 1350 can include, but is not limited to, a modem or network card and the communication channel 1390 can be implemented, for example, within a wired and/or a wireless medium.

Data is streamed to the system 1300, in various embodiments, using a Wi-Fi network such as IEEE 802.11. The Wi-Fi signal of these embodiments is received over the communications channel 1390 and the communications interface 1350 which are adapted for Wi-Fi communications. The communications channel 1390 of these embodiments is typically connected to an access point or router that provides access to outside networks including the Internet for allowing streaming applications and other over-the-top communications. Other embodiments provide streamed data to the system 1300 using a set-top box that delivers the data over the HDMI connection of the input block 1305. Still other embodiments provide streamed data to the system 1300 using the RF connection of the input block 1305.

The system 1300 can provide an output signal to various output devices, including a display 1365, speakers 1375, and other peripheral devices 1385. The other peripheral devices 1385 include, in various examples of embodiments, one or more of a stand-alone DVR, a disk player, a stereo system, a lighting system, and other devices that provide a function based on the output of the system 1300. In various embodiments, control signals are communicated between the system 1300 and the display 1365, speakers 1375, or other peripheral devices 1385 using signaling such as AV.Link, CEC, or other communications protocols that enable device-to-device control with or without user intervention. The output devices can be communicatively coupled to system 1300 via dedicated connections through respective interfaces 1360, 1370, and 1380. Alternatively, the output devices can be connected to system 1300 using the communications channel 1390 via the communications interface 1350. The display 1365 and speakers 1375 can be integrated in a single unit with the other components of system 1300 in an electronic device, for example, a television. In various embodiments, the display interface 1360 includes a display driver, for example, a timing controller (T Con) chip.

The display 1365 and speaker 1375 can alternatively be separate from one or more of the other components, for example, if the RF portion of input 1305 is part of a separate set-top box. In various embodiments in which the display 1365 and speakers 1375 are external components, the output signal can be provided via dedicated output connections, including, for example, HDMI ports, USB ports, or COMP outputs.

According to an embodiment, a method for video decoding is presented, comprising: accessing a predicted value of a sample of a block of an image in a video, corresponding to an intra prediction mode; determining, based on a location of said sample in said block and said intra prediction mode, that said predicted value of said sample is to be adjusted; adjusting said predicted value of said sample, responsive to a reference sample and a predicted value of said reference sample; accessing prediction residual of said sample; and decoding said sample responsive to said adjusted predicted value and said prediction residual.

According to another embodiment, a method for video encoding is presented, comprising: accessing a predicted value of a sample of a block of an image in a video, corresponding to an intra prediction mode; determining, based on a location of said sample in said block and said intra prediction mode, that said predicted value of said sample is to be adjusted; adjusting predicted value of said sample, responsive to reference sample and a predicted value of said reference sample; generating prediction residual for said sample responsive to said adjusted predicted value; and encoding said intra prediction mode and said prediction residual.

According to another embodiment, an apparatus for video decoding is presented, comprising one or more processors, wherein said one or more processors are configured to: access a predicted value of a sample of a block of an image in a video, corresponding to an intra prediction mode; determine, based on a location of said sample in said block and said intra prediction mode, that said predicted value of said sample is to be adjusted; adjust said predicted value of said sample, responsive to a reference sample and a predicted value of said reference sample; access prediction residual of said sample; and decode said sample responsive to said adjusted predicted value and said prediction residual.

According to another embodiment, an apparatus for video encoding is presented, comprising one or more processors, wherein said one or more processors are configured to: access a predicted value of a sample of a block of an image in a video, corresponding to an intra prediction mode; determine, based on a location of said sample in said block and said intra prediction mode, that said predicted value of said sample is to be adjusted; adjust said predicted value of said sample, responsive to a reference sample and a predicted value of said reference sample; generate prediction residual for said sample responsive to said adjusted predicted value; and encode said intra prediction mode and said prediction residual.

According to another embodiment, an apparatus for video decoding is presented, comprising: means for accessing a predicted value of a sample of a block of an image in a video, corresponding to an intra prediction mode; means for determining, based on a location of said sample in said block and said intra prediction mode, that said predicted value of said sample is to be adjusted; means for adjusting said predicted value of said sample, responsive to a reference sample and a predicted value of said reference sample; means for accessing prediction residual of said sample; and means for decoding said sample responsive to said adjusted predicted value and said prediction residual.

According to another embodiment, an apparatus for video encoding is presented, comprising: means for accessing a predicted value of a sample of a block of an image in a video, corresponding to an intra prediction mode; means for determining, based on a location of said sample in said block and said intra prediction mode, that said predicted value of said sample is to be adjusted; means for adjusting said predicted value of said sample, responsive to a reference sample and a predicted value of said reference sample; means for generating prediction residual for said sample responsive to said adjusted predicted value; and means for encoding said intra prediction mode and said prediction residual.

According to another embodiment, a video signal is presented, formed by performing: accessing a predicted value of a sample of a block of an image in a video, corresponding to an intra prediction mode; determining, based on a location of said sample in said block and said intra prediction mode, that said predicted value of said sample is to be adjusted; adjusting predicted value of said sample, responsive to reference sample and a predicted value of said reference sample; generating prediction residual for said sample responsive to said adjusted predicted value; and encoding said intra prediction mode and said prediction residual.

According to one embodiment, said adjusting is based on a gradient between a reference sample and said predicted value of said reference sample.

According to one embodiment, said predicted value for said reference sample is responsive to said intra prediction mode.

According to one embodiment, said reference sample is at a same row or column as said sample of said block.

According to one embodiment, said adjusting is responsive to said gradient and a weight, said weight being based on a location of said sample of said block.

According to one embodiment, said sample is determined to be adjusted when said sample is close to a left boundary and said intra prediction mode corresponds to a vertical prediction direction.

According to one embodiment, said sample is determined to be adjusted when said sample is close to a top boundary and said intra prediction mode corresponds to a horizontal prediction direction.

According to one embodiment, said adjustment is performed by choosing, responsive to said intra prediction mode, a filtering method to adjust said predicted value.

According to one embodiment, whether to adjust is based on an average of gradients at a reference array.

According to one embodiment, there is a single reference layer for intra prediction.

According to one embodiment, when said intra prediction mode is a directly horizontal or a directly vertical mode, said predicted value of said reference sample is a value of a top-left reference sample.

An embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

Various implementations involve decoding. "Decoding," as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video decoding, comprising:
   accessing a predicted value of a sample of a block of an image in a video, corresponding to a vertical intra prediction mode;
   determining, based on a location of said sample in said block and said vertical intra prediction mode, that said predicted value of said sample is to be adjusted;
   adjusting said predicted value of said sample, responsive to a difference of a reference sample and a predicted value of said reference sample using said vertical intra prediction mode and a scaling factor, wherein said reference sample is from a left reference array and is at a same vertical position as said sample, wherein said scaling factor depends on said horizontal location of said sample in said block and a size of said block, said adjusting including:
      multiplying said difference of said reference sample and said predicted value of said reference sample by said scaling factor to obtain a scaled difference,
      adding said scaled difference to an integer N to form a sum, and
      right shifting said sum by M bits to obtain an adjusted predicted value of said sample, wherein $2^{M-1}=N$;
   accessing a prediction residual of said sample; and
   decoding said sample responsive to a sum of said adjusted predicted value and said prediction residual.

2. The method of claim 1, wherein said predicted value for said reference sample is a top-left reference sample for said block.

3. The method of claim 2, wherein said scaling factor=32>>((x<<1)>>s), s=(log 2(W)−1+log 2(H)−1)>>2, and W and H are width and height of said block, respectively.

4. The method of claim 1, wherein said sample is determined to be adjusted when said sample is close to a left boundary of said block and said vertical intra prediction mode corresponds to a directly vertical prediction direction.

5. The method of claim 1, wherein M=6 and N=32.

6. A method for video encoding, comprising:
   accessing a predicted value of a sample of a block of an image in a video, corresponding to a vertical intra prediction mode;
   determining, based on a location of said sample in said block and said vertical intra prediction mode, that said predicted value of said sample is to be adjusted;
   adjusting predicted value of said sample, responsive to a difference of reference sample and a predicted value of said reference sample using said vertical intra prediction mode and a scaling factor, wherein said reference sample is from a left reference array and is at a same vertical position as said sample, wherein said scaling factor depends on said horizontal location of said sample in said block and a size of said block, said adjusting including:
      multiplying said difference of said reference sample and said predicted value of said reference sample by said scaling factor to obtain a scaled difference,
      adding said scaled difference to an integer N to form a sum, and
      right shifting said sum by M bits to obtain an adjusted predicted value of said sample, wherein $2^{M-1}=N$;
   generating a prediction residual for said sample responsive to a difference of said sample and said adjusted predicted value; and
   encoding said vertical intra prediction mode and said prediction residual.

7. The method of claim 6, wherein said predicted value for said reference sample is a top-left reference sample for said block.

8. The method of claim 7, wherein said scaling factor=32>>((x<<1)>>s), s=(log 2(W)−1+log 2(H)−1)>>2, and W and H are width and height of said block, respectively.

9. The method of claim 6, wherein said sample is determined to be adjusted when said sample is close to a left boundary of said block and said vertical intra prediction mode corresponds to a directly vertical prediction direction.

10. The method of claim 6, wherein M=6 and N=32.

11. An apparatus for decoding video data, comprising:
    one or more processors and at least a memory, wherein said one or more processors are configured to:
    access a predicted value of a sample of a block of an image in a video, corresponding to a vertical intra prediction mode;
    determine, based on a location of said sample in said block and said vertical intra prediction mode, that said predicted value of said sample is to be adjusted;
    adjust said predicted value of said sample, responsive to a difference of a reference sample and a predicted value of said reference sample using said vertical intra prediction mode and a scaling factor, wherein said reference sample is from a left reference array and is at a same vertical position as said sample, wherein said scaling factor depends on said location of said sample and a size of said block, wherein said one or more processors are configured to adjust said predicted value of said sample by performing:
       multiplying said difference of said reference sample and said predicted value of said reference sample by said scaling factor to obtain a scaled difference,
       adding said scaled difference to an integer N to form a sum, and
       right shifting said sum by M bits to obtain an adjusted predicted value of said sample, wherein $2^{M-1}=N$;
    access a prediction residual of said sample; and
    decode said sample responsive to a sum of said adjusted predicted value and said prediction residual.

12. The apparatus of claim 11, wherein said predicted value for said reference sample is a top-left reference sample for said block.

13. The apparatus of claim 12, wherein said scaling factor=32>>((x<<1)>>s), s=(log 2(W)−1+log 2(H)−1)>>2, and W and H are width and height of said block, respectively.

14. The apparatus of claim 11, wherein said sample is determined to be adjusted when said sample is close to a left boundary of said block and said vertical intra prediction mode corresponds to a directly vertical prediction direction.

15. The apparatus of claim 11, wherein M=6 and N=32.

16. An apparatus for encoding video data, comprising:
one or more processors and at least a memory, wherein said one or more processors are configured to:
access a predicted value of a sample of a block of an image in a video, corresponding to a vertical intra prediction mode;
determine, based on a location of said sample in said block and said intra prediction mode, that said predicted value of said sample is to be adjusted;
adjust said predicted value of said sample, responsive to a difference of a reference sample and a predicted value of said reference sample using said vertical intra prediction mode and a scaling factor, wherein said reference sample is from a left reference array and is at a same vertical position as said sample, wherein said scaling factor depends on said location of said sample and a size of said block, wherein said one or more processors are configured to adjust said predicted value of said sample by performing:
multiplying said difference of said reference sample and said predicted value of said reference sample by said scaling factor to obtain a scaled difference,
adding said scaled difference to an integer N to form a sum, and
right shifting said sum by M bits to obtain an adjusted predicted value of said sample, wherein $2^{M-1}$=N;
generate a prediction residual for said sample responsive to a difference of said sample and said adjusted predicted value; and
encode said vertical intra prediction mode and said prediction residual.

17. The apparatus of claim 16, wherein said predicted value for said reference sample is a top-left reference sample for said block.

18. The apparatus of claim 17, wherein said scaling factor=32>>((x<<1)>>s), s=(log 2(W)−1+log 2(H)−1)>>2, and W and H are width and height of said block, respectively.

19. The apparatus of claim 16, wherein said sample is determined to be adjusted when said sample is close to a left boundary of said block and said vertical intra prediction mode corresponds to a directly vertical prediction direction.

20. The apparatus of claim 16, wherein M=6 and N=32.

* * * * *